United States Patent [19]
Norsen

[11] Patent Number: 5,239,884
[45] Date of Patent: Aug. 31, 1993

[54] CHILD'S SNOWMOBILE HANDLEBAR ARRANGEMENT

[76] Inventor: Kristin N. Norsen, 2322 Magog Rd., Palmyra, N.Y. 14522

[21] Appl. No.: 877,997

[22] Filed: May 4, 1992

[51] Int. Cl.$^5$ .............................. B62K 21/12
[52] U.S. Cl. ........................ 74/551.8; 74/551.1; 24/336; 24/615; 403/233; 403/236; 403/328; 403/108; 200/61.85; 200/61.87
[58] Field of Search ............ 74/551.1–551.8; 24/336, 279, 615, 616, 573.1, 607; 403/236, 233, 108, 328, 329; 180/335; 200/61.85, 296, 293.1, 61.87

[56] References Cited

U.S. PATENT DOCUMENTS

| | | | |
|---|---|---|---|
| 1,445,995 | 2/1923 | Carlson | 74/551.8 |
| 2,980,456 | 4/1961 | McMullin | 403/328 |
| 3,667,315 | 6/1972 | Polly | 74/551.8 |
| 4,250,770 | 2/1981 | Robertson | 74/551.8 |
| 4,347,893 | 9/1982 | Moyer | 74/551.8 |
| 4,471,209 | 9/1984 | Hollander | 74/551.8 |
| 4,577,877 | 3/1986 | Kassai | 403/328 X |
| 4,619,341 | 10/1986 | Davis | 180/335 |
| 4,771,148 | 9/1988 | Bersonnet | 200/61.85 X |
| 4,868,544 | 9/1989 | Havens | 74/551.8 X |
| 5,064,157 | 11/1991 | O'Neal | 74/551.1 X |

FOREIGN PATENT DOCUMENTS

| | | | |
|---|---|---|---|
| 92678 | 4/1896 | Fed. Rep. of Germany | 74/551.1 |
| 102191 | 7/1941 | Sweden | 403/328 |
| 583356 | 12/1946 | United Kingdom | 74/551.8 |

Primary Examiner—Vinh T. Luong
Attorney, Agent, or Firm—Leon Gilden

[57] ABSTRACT

A handlebar mounted to a snowmobile framework has an accessory bar secured spanning opposed legs of the handlebar, wherein the accessory bar is arranged to include a heating coil selectively operative to effect heating of an exterior sheath of the accessory bar organization.

3 Claims, 4 Drawing Sheets

CHILD'S SNOWMOBILE HANDLEBAR ARRANGEMENT

BACKGROUND OF THE INVENTION

1. Field of the Invention

The field of invention relates to handlebar apparatus, and more particularly pertains to a new and improved child's snowmobile handlebar arrangement wherein the same provides for additional grasp bar for a child, as well as a heated bar to insure comfort and convenience during usage.

2. Description of the Prior Art

Various handlebar structure has been presented in the prior art to accommodate additional riders as well as various child's accessory structure to accommodate children in self-propelled vehicles. U.S. Pat. No. 4,619,341 to Davis sets forth a throttle-grab bar apparatus for snowmobiles setting forth a grab bar arranged between opposed ends of the handlebar structure.

U.S. Pat. No. 4,195,879 to Miller sets forth an infant's seat for use with snowmobiles.

U.S. Pat. No. 4,710,599 to Motodate, et al. sets forth a switch attachment for use of motorcycle vehicles with handlebars for convenience of access to various switches relative to the handlebar structure.

As such, it may be appreciated that there continues to be a need for a new and improved child's snowmobile handlebar arrangement as set forth by the instant invention which addresses both the problems of ease of use as well as effectiveness in construction in accommodating children in motorcycle travel and in this respect, the present invention substantially fulfills this need.

SUMMARY OF THE INVENTION

In view of the foregoing disadvantages inherent in the known types of motorcycle apparatus now present in the prior art, the present invention provides a child's snowmobile handlebar arrangement wherein the same accommodates a child grasping a handlebar arrangement during usage of the snowmobile. As such, the general purpose of the present invention, which will be described subsequently in greater detail, is to provide a new and improved child's snowmobile handlebar arrangement which has all the advantages of the prior art motorcycle apparatus and none of the disadvantages.

To attain this, the present invention provides a handlebar mounted to a snowmobile framework, with an accessory bar secured spanning opposed legs of the handlebar, wherein the accessory bar is arranged to include a heating coil selectively operative to effect heating of an exterior sheath of the accessory bar organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child's snowmobile handlebar arrangement which has all the advantages of the prior art snowmobile apparatus and none of the disadvantages.

It is another object of the present invention to provide a new and improved child's snowmobile handlebar arrangement which may be easily and efficiently manufactured and marketed.

It is a further object of the present invention to provide a new and improved child's snowmobile handlebar arrangement which is of a durable and reliable construction.

An even further object of the present invention is to provide a new and improved child's snowmobile handlebar arrangement which is susceptible of a low cost of manufacture with regard to both materials and labor, and which accordingly is then susceptible of low prices of sale to the consuming public, thereby making such child's snowmobile handlebar arrangement economically available to the buying public.

Still yet another object of the present invention is to provide a new and improved child's snowmobile handlebar arrangement which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
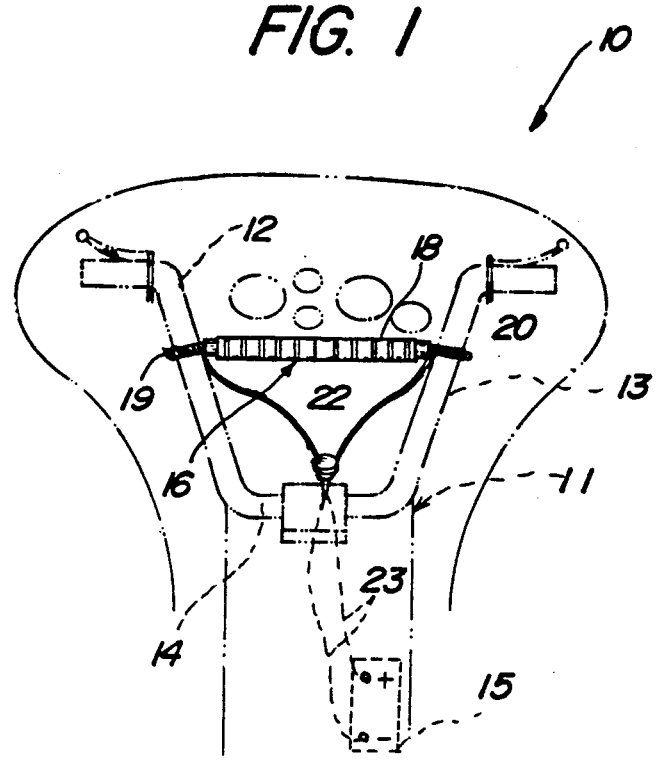
FIG. 1 is an orthographic top view of the invention in combination with a snowmobile structure.
Figure 2:
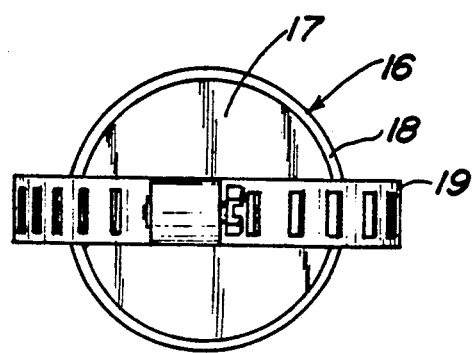
FIG. 2 is an orthographic end view of the handlebar arrangement of the invention.
Figure 3:
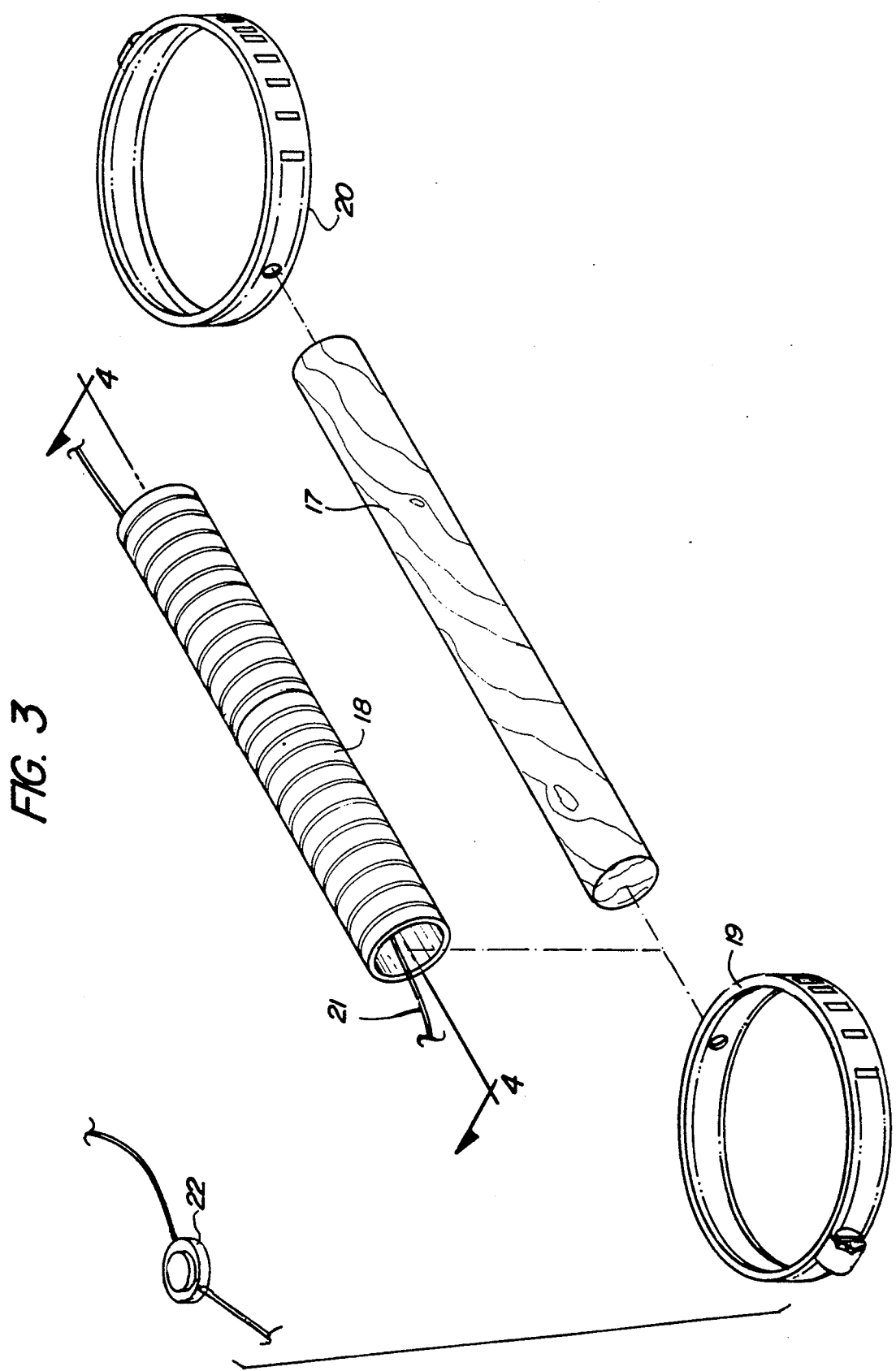
FIG. 3 is an isometric exploded view of the handlebar accessory structure.
Figure 4:
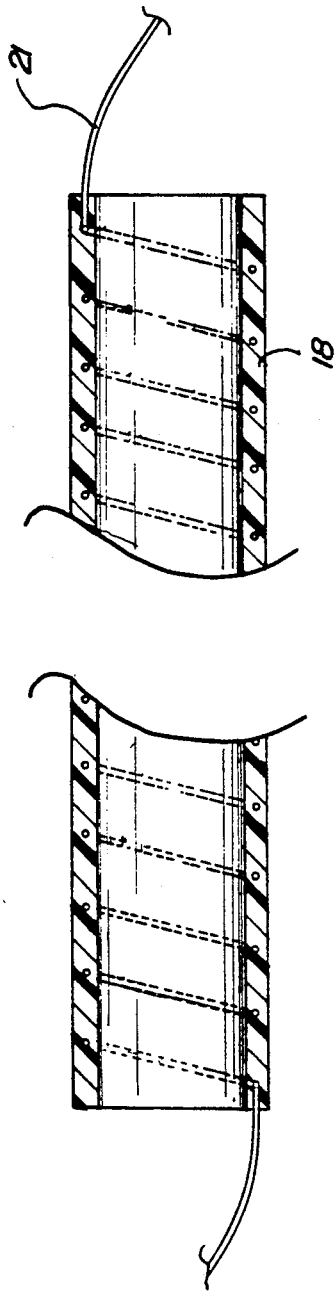
FIG. 4 is an orthographic cross-sectional illustration, taken along the lines 4—4 of FIG. 3 in the direction indicated by the arrows.

With reference now to the drawings, and in particular to FIGS. 1 to 7 thereof, a new and improved child's snowmobile handlebar arrangement embodying the principles and concepts of the present invention and generally designated by the reference numeral 10 will be described.

More specifically, the child's snowmobile handlebar arrangement 10 of the instant invention essentially comprises a motorcycle frame assembly 11, including a handlebar arrangement having a handlebar first leg 12 spaced from a second leg 13, with a handlebar interconnecting leg 14 extending between lower distal ends of the first and second handlebar legs 12 and 13. An accessory bar 16 is mounted in a generally parallel relationship above the connecting leg 14 to include a central support shaft 17, with a heat transmissive sheath 18 of tubular construction arranged in surrounding relationship relative to the support shaft 17. First and second encircling clamps 19 and 20 are mounted to respective first and second distal ends of the central support shaft 17, with the first and second clamps 19 and 20 mounted to the respective handlebar first and second legs 12 and 13. The heat transmissive sheath 18 includes an electrical heat resistance cable 21 helically wound within the sheath 18, wherein a switch 22 mounted to the handlebar framework, and more typically to the connecting leg 14, is arranged in electrical communication with the electrical battery cables 23 mounted to the snowmobile battery 15 to direct electrical energy to the electrical heat resistance cable 21 for heating of the heat transmissive sheath 18 for comfort of a child grasping the sheath.

Figure 5:
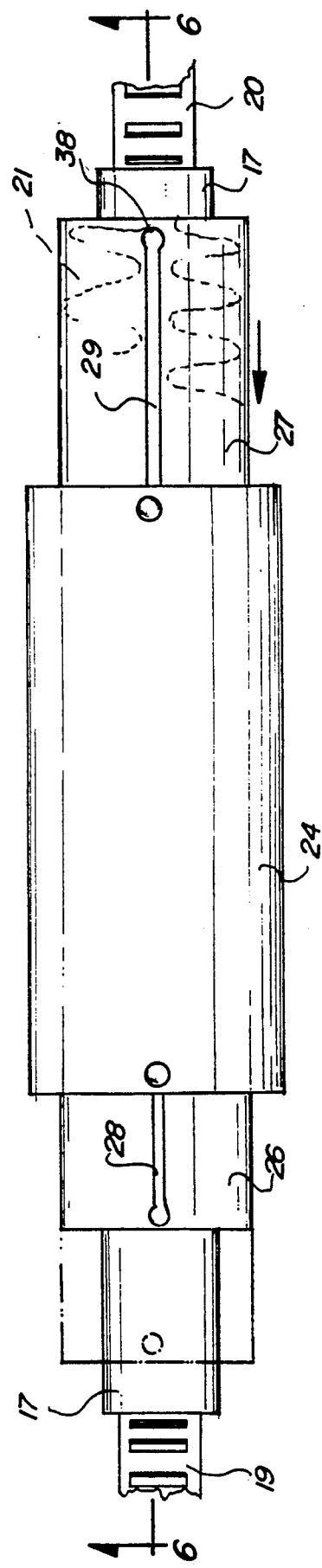
FIG. 5 is an orthographic top view of a modified accessory bar structure of the invention.
Figure 6:
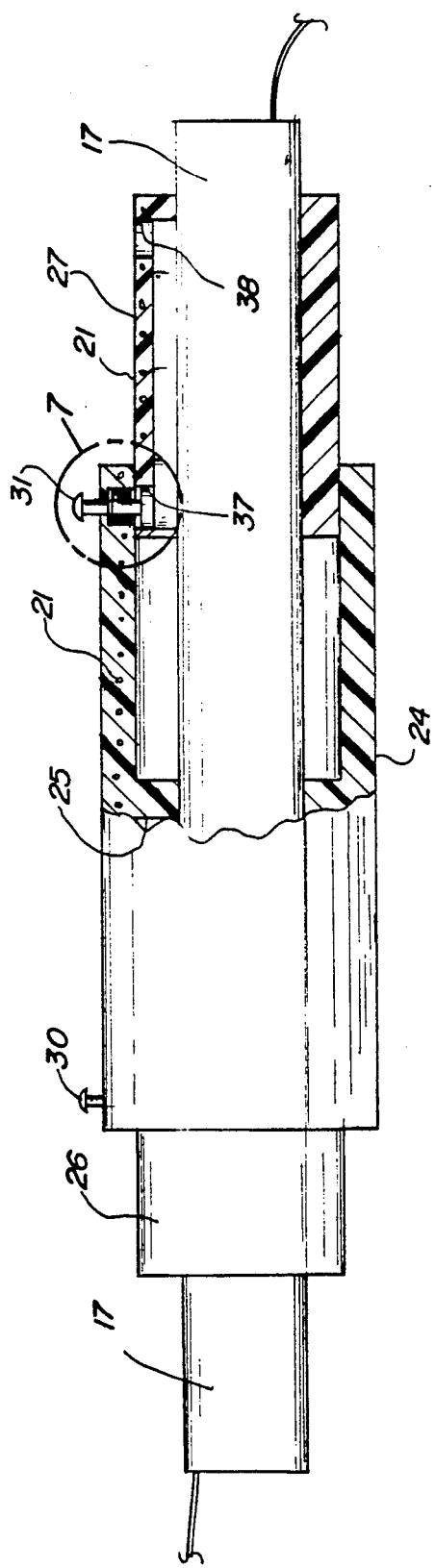
FIG. 6 is an orthographic view, taken along the lines 6—6 of FIG. 5 in the direction indicated by the arrows.
Figure 7:
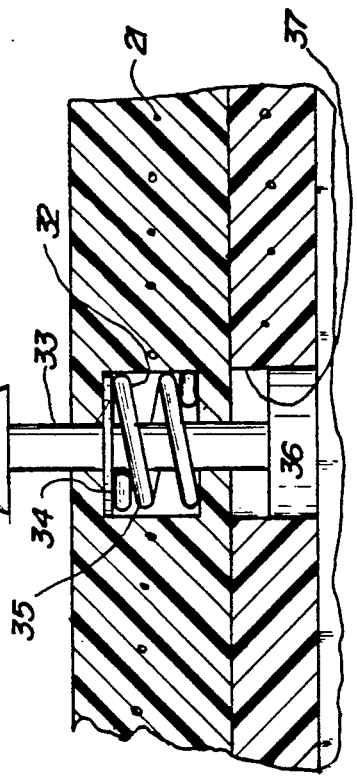
FIG. 7 is an orthographic view of section 7 as set forth in FIG. 6.

The FIGS. 5-7 illustrate a modified accessory bar structure, wherein the encircling sheath is formed with a central sheath 24 having a connecting web 25 medially and diametrically directed across the central sheath 24 fixedly mounted to the central shaft 17 orthogonally oriented relative to the central shaft 18. A respective first and second outer sheath 26 and 27 are telescoping received between the central sheath 24 and the central support shaft 17 on opposed sides of the central sheath connecting web 25. Elongate first and second sheath slots 28 and 29 that are arranged in a colinear relationship relative to one another (see FIG. 5) are mounted through respective first and second outer sheaths 26 and 27, with a respective first and second lock pin 30 and 31 slidably received within the first and second sheath slots 28 and 29. The first and second lock pins 30 and 31 each include a lock pin cavity 32 (see FIG. 7) having a lock pin rod 33 coaxially directed through the lock pin cavity 32. A rod plate 34 is mounted fixedly to the lock pin rod 33 within the cavity 32 capturing a spring 35 between a floor of the cavity 32 and the rod plate 34 to normally bias the lock pin rod 33 in a raised orientation, as illustrated in FIG. 7. To permit axle displacement of a respective first or second outer sheath 26 and 27 relative to the central sheath 24, a respective lock pin has its lock pin rod 33 depressed to direct the lock pin lower head 36 below the associated slot into a tubular gap defined between the first and second sheaths 26 and 27 and a central shaft 17. It should be noted that each distal end of each slot includes a generally circular end portion to receive the lock pin lower head 36 therewithin, whereupon depressing of the lock pin lower head 36 below the slot permits sliding of the lock pin rod 33 within the associated slot. The first and second outer sheaths 26 and 27 each include rear and forward outer sheath bores 37 and 38 defining the circular ends of the associated slot structure to receive the lock pin head 36 therewithin. In this manner, the sheath structure may be extended or retracted as desired to accommodate passengers such as children of various size, with a grasp bar structure of various diameter permitting convenience of size and adjustment of such size in grasping of the central sheath 24 or the outer sheath structure 26 and 27, or even the central shaft 17 dependent upon the size of the child's hand.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A child's snowmobile handlebar arrangement for securement to a snowmobile frame assembly, wherein the snowmobile frame assembly includes a handlebar first leg spaced from a handlebar second leg, and a handlebar connecting leg directed between the handlebar first leg and the handlebar second leg, and the snowmobile including a snowmobile battery, wherein the snowmobile handlebar arrangement comprises, an accessory bar, the accessory bar including a central support shaft, the central support shaft including a support shaft first end and a support shaft second end, the first end including a first encircling clamp, the second end including a second encircling clamp, wherein the first encircling clamp is arranged for securement to the handlebar first leg, the second encircling clamp is arranged for securement to the handlebar second leg, and a heat transmissive sheath is arranged in a surrounding relationship relative to the central shaft, the heat transmissive sheath includes an electrical resistance cable directed therethrough, and a switch member, the switch member arranged in electrical communication with the snowmobile battery to direct electrical energy to the electrical heat resistance cable, and the sheath includes a central sheath, the central sheath including a connecting web medially and orthogonally directed within the central sheath fixedly mounted medially of the central shaft, the central sheath arranged in a coaxially aligned relationship relative to the central shaft and includes a tubular gap between the central shaft and the central sheath, and a first outer sheath is telescopingly mounted within the tubular gap between the central sheath and the central shaft to a first side of the central sheath, and a second outer sheath is telescopingly received within the tubular gap between the central sheath and the central shaft to a second side of the connecting web.

2. A handlebar arrangement as set forth in claim 1 wherein the first outer sheath includes a first elongate slot, the second outer sheath includes a second elongate slot, wherein the first slot and the second slot are arranged in a colinear relationship, and a first lock pin mounted within the central sheath is slidably received within the first slot, and a second lock pin mounted within the central sheath is slidably received within the second slot.

3. A handlebar arrangement as set forth in claim 2 wherein the first slot and the second slot each include a rear bore and a forward bore at respective rear and forward ends of each slot, and each lock pin includes a lock pin lower head arranged for reception within a respective rear or forward bore, wherein each lock pin includes a lock pin rod, and each lock pin is mounted within a lock pin cavity, with each lock pin cavity positioned within the central sheath, and each lock pin rod includes a lock pin rod plate mounted within the cavity spaced above a floor of each cavity, and a spring captured between the lock pin rod plate and the floor to bias each lock pin rod in a raised orientation positioning the lock pin lower head within the respective rear or forward bore of a respective slot.

* * * * *